United States Patent
Chen et al.

(10) Patent No.: US 6,819,556 B2
(45) Date of Patent: Nov. 16, 2004

(54) SERVER SYSTEM AND VIBRATION-FREE EXTRACTABLE HARD DISC DRIVE ASSEMBLY THEREOF

(75) Inventors: Chao-Jung Chen, Taipei (TW); Hsiang-Wei Liu, Luchou (TW)

(73) Assignee: Quanta Computer Inc., Tao Yuan Shien (TW)

( * ) Notice: Subject to any disclaimer, the term of this patent is extended or adjusted under 35 U.S.C. 154(b) by 70 days.

(21) Appl. No.: 10/412,879

(22) Filed: Apr. 14, 2003

(65) Prior Publication Data

US 2004/0105231 A1 Jun. 3, 2004

(51) Int. Cl.[7] .................................................. H05K 7/00
(52) U.S. Cl. ........................ 361/685; 361/741; 312/333; 360/137
(58) Field of Search ................................ 361/679–687, 361/724–727, 747, 610; 312/332.1, 333; 360/137, 137 D; 439/923

(56) References Cited

U.S. PATENT DOCUMENTS 6,490,242 B1 * 12/2002 Bonn et al. ................. 369/291
6,535,390 B1 * 3/2003 Lo ............................. 361/726
6,587,348 B2 * 7/2003 Kondo ....................... 361/741

* cited by examiner

Primary Examiner—Hung Van Duong
(74) Attorney, Agent, or Firm—Thomas, Kayden, Horstemeyer & Risley

(57) ABSTRACT

A server system and a vibration-free extractable hard disc drive assembly thereof. The server system includes a chassis and the vibration-free hard disc drive assembly. The assembly is disposed in the chassis in an extractable manner. The vibration-free hard disc drive assembly includes a tray, a vibration-absorbing pad, and a hard disc drive. The tray is disposed in the chassis in an extractable manner. The vibration-absorbing pad is disposed on the tray. The hard disc drive is disposed on the tray via the vibration-absorbing pad. Thus, external vibration transmitted to the tray is reduced by the vibration-absorbing pad, limiting the vibration transmitted to the hard disc drive; therefore, the vibration applied to the hard disc drive is reduced.

20 Claims, 5 Drawing Sheets

SERVER SYSTEM AND VIBRATION-FREE EXTRACTABLE HARD DISC DRIVE ASSEMBLY THEREOF

BACKGROUND OF THE INVENTION

1. Field of the Invention

The invention relates to a server system and a vibration-free extractable hard disc drive assembly thereof; in particular, to a vibration-free hard disc drive assembly that can reduce the vibration transmitted to the hard disc drive.

2. Description of the Related Art

Extractable hard disc drives are used primarily in server storage systems so that a hard disc drive can be conveniently changed. However, since an extractable hard disc drive is slideably disposed in a chassis of the server storage system, it is not fixedly assembled therein. As a result, when the server system vibrates, the hard disc drive is easily affected.

During the vibration, resonance is generated throughout the extractable hard disc drive and increases the severity of the vibration. As a result, the hard disc drive may fail due to excess vibration. Furthermore, since the server storage system must operate continuously, its vibration standard is stricter than a normal personal computer.

To solve the vibration problem, the conventional server system is provided with a sandwich-typed steel plate to absorb vibration. That is, a vibration-free structure is added between two steel plates. The advantage of such a structure is that it lessens the effects of vibration on the extractable hard disc drive. The cost of such a structure, however, is much higher.

SUMMARY OF THE INVENTION

In view of this, the invention provides a server system and a vibration-free extractable hard disc drive assembly thereof, wherein the vibration-free hard disc drive assembly can reduce the vibration transmitted to the hard disc drive.

Accordingly, the invention provides a vibration-free extractable hard disc drive assembly for a server system. The hard disc drive assembly includes a tray, a vibration-absorbing pad, and a hard disc drive. The vibration-absorbing pad is disposed on the tray. The hard disc drive is disposed on the tray via the vibration-absorbing pad. Thus, external vibration transmitted to the tray is reduced by the vibration-absorbing pad, limiting the vibration transmitted to the hard disc drive; therefore, the vibration applied to the hard disc drive is reduced.

In a preferred embodiment, the assembly further includes a screw. The screw is passed through the vibration-absorbing pad, and combines the tray and the hard disc drive.

Furthermore, the screw includes a step portion for preventing the vibration-absorbing pad exerting excess pressure.

In another embodiment, the tray includes a notch in which the vibration-absorbing pad is disposed.

Furthermore, the vibration-absorbing pad includes a groove to be combined with the notch of the tray.

Furthermore, the notch is substantially C-shaped to prevent the vibration-absorbing pad disposed in the notch from separating from the notch.

In another embodiment, the device further includes an anti-ESD member abutting the screw and the tray to prevent ESD in the hard disc drive.

Furthermore, the anti-ESD member surrounds the vibration-absorbing pad.

In another embodiment, there is a plurality of vibration-absorbing pads, and the vibration-absorbing pads are disposed at both sides of the chassis in a symmetrical manner.

It is understood that the vibration-absorbing pad may be made of rubber.

In another embodiment, the hardness of the vibration-absorbing pad is 70+/−5, and the damping coefficient of the vibration-absorbing pad is tan $\delta$=0.5~0.9.

In this invention, a server system is provided. The server system includes a chassis and a vibration-free hard disc drive assembly. The assembly is disposed in the chassis in an extractable manner. The vibration-free hard disc drive assembly includes a tray, a vibration-absorbing pad, and a hard disc drive. The tray is disposed in the chassis in an extractable manner. The vibration-absorbing pad is disposed on the tray. The hard disc drive is disposed on the tray via the vibration-absorbing pad. Thus, after a vibration transmitted to the tray from the chassis is reduced by the vibration-absorbing pad, the vibration is transmitted to the hard disc drive; therefore, the vibration applied to the hard disc drive is reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
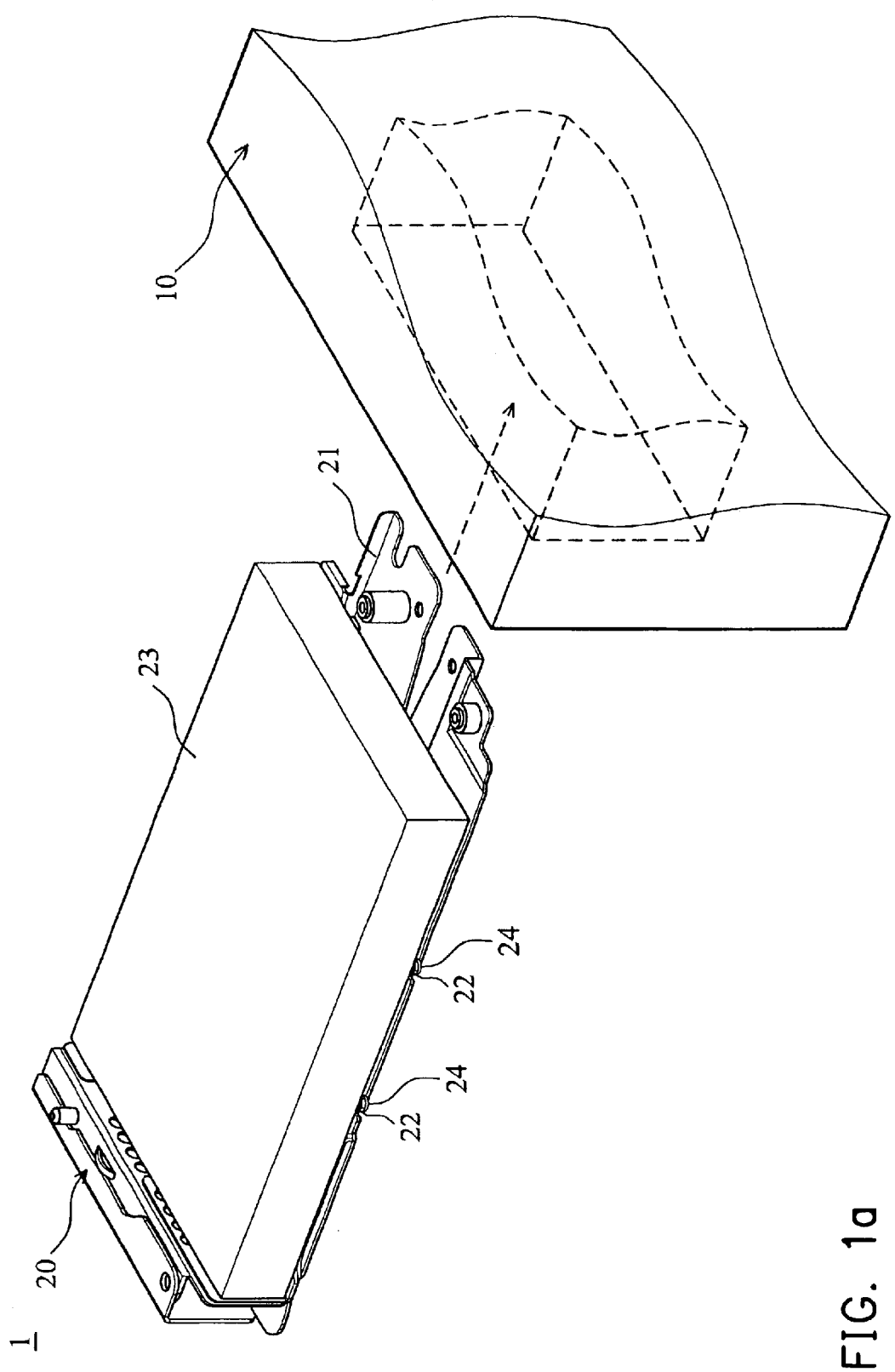
FIG. 1a is a schematic view of a server system as disclosed in this invention.
Figure 1B:
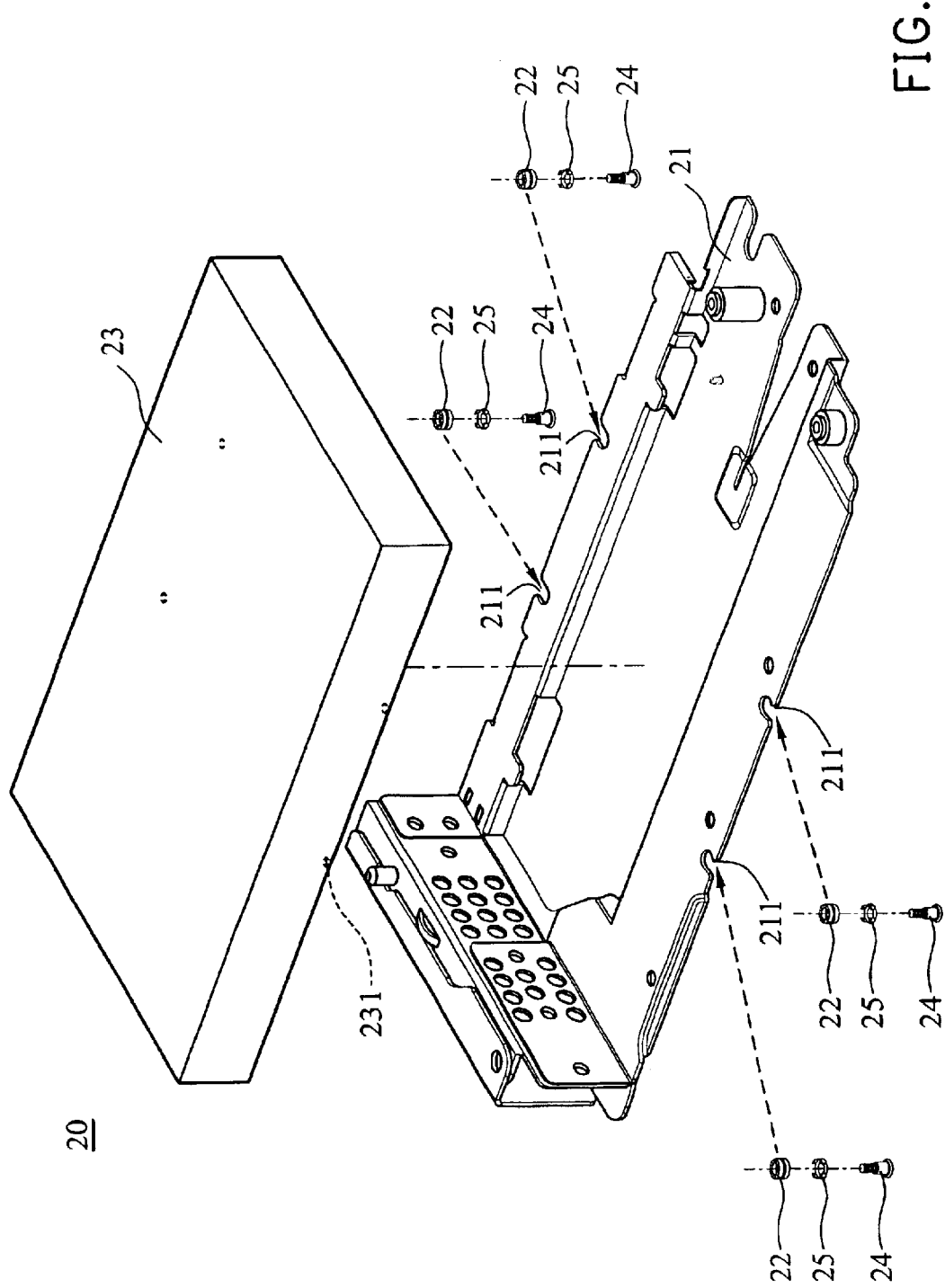
FIG. 1b a schematic view of a vibration-free extractable hard disc drive assembly as disclosed in this invention.

FIG. 1a shows a server system 1 as disclosed in this invention. The server system 1 includes a chassis 10 and a vibration-free hard disc drive assembly 20. The vibration-free hard disc drive assembly 20 is disposed in the chassis 10 in an extractable manner. As shown in FIG. 1b, the vibration-free hard disc drive assembly 20 includes a tray 21, four vibration-absorbing pads 22, a hard disc drive 23, four screws 24, and four anti-ESD(electrostatic discharge) members 25.

The tray 21 is used as a base of the vibration-free hard disc drive assembly 20, and is disposed in the chassis 10 in an extractable manner. The hard disc drive 23 is supported by the tray 21. Furthermore, as shown in FIG. 1b, the tray 21 includes two notches 211 at each of both sides. The notches 211 are formed on the tray 21 in a symmetrical manner, and are used for the vibration-absorbing pads 22 to dispose therein. It is understood that the notches 211 may be substantially C-shaped or calabash-shaped with a small entrance to prevent the vibration-absorbing pad 22 disposed in the notch 211 from separating from the notch 211.

Figure 1C:
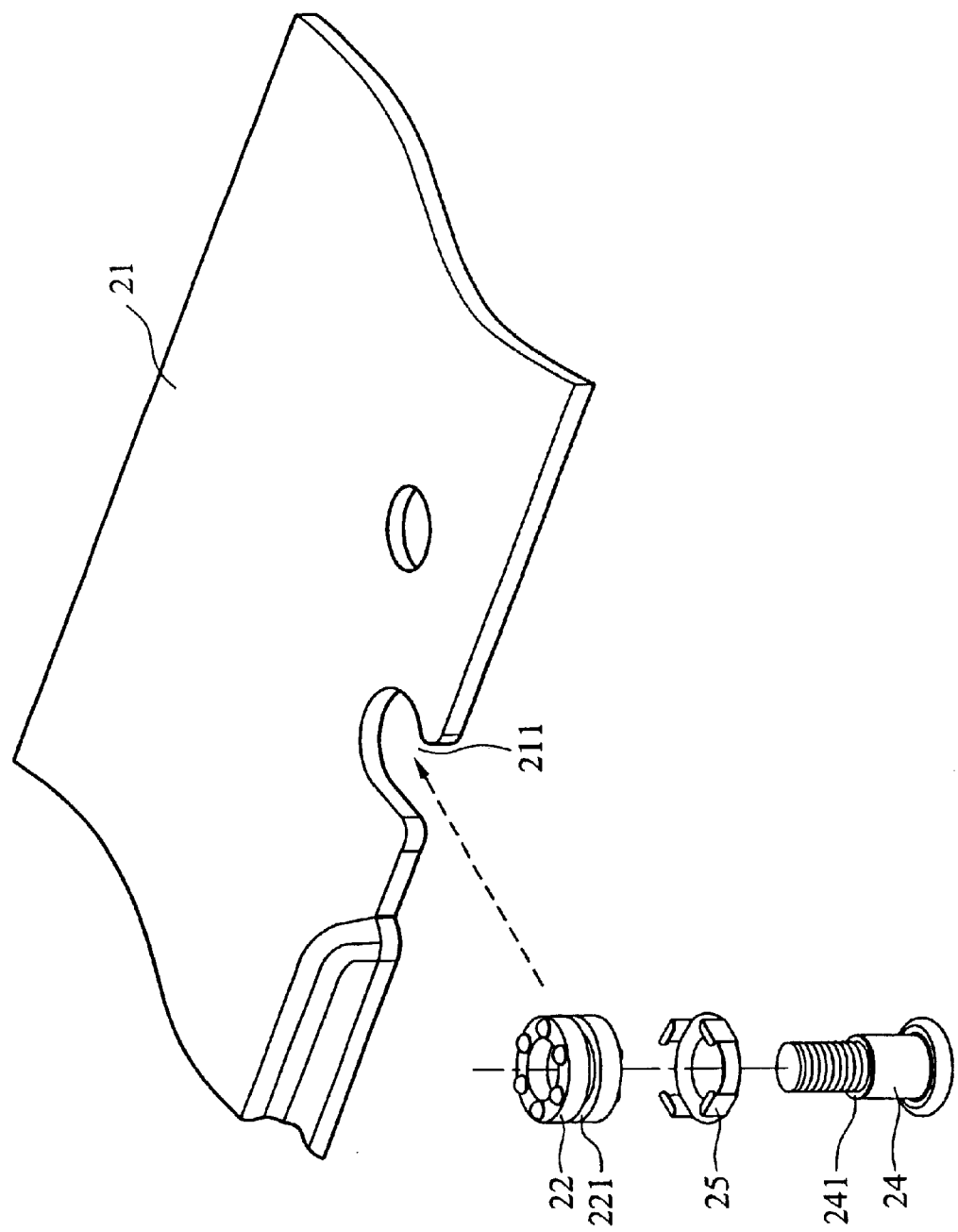
FIG. 1c is a partially enlarged view of FIG. 1b.

Each of the vibration-absorbing pads 22 is used to reduce a vibration transmitted to the tray 21 from the chassis 10. Each of the vibration-absorbing pads 22 includes a groove 221 around its central portion, as shown in FIG. 1c, to be combined with the notch 211 of the tray 21. That is, each of the vibration-absorbing pads 22 is disposed on the tray 21 in a manner such that the notch 211 is engaged with the groove 221.

It is understood that the vibration-absorbing pads 22 may be made of rubber. Furthermore, under the proper vibration or measurement analysis, the inventor of this invention discovers that the hardness of each vibration-absorbing pad 22 is 70+/−5, and the damping coefficient of each vibration-absorbing pad 22 is tan $\delta 6 = 0.5 \sim 0.9$.

The hard disc drive 23 includes four screw holes 231 at its bottom portion, and is disposed on the tray 21 via the vibration-absorbing pads 22. As stated above, after the vibration from the chassis 10 to the tray 21 is reduced by the vibration-absorbing pad 22, the vibration is transmitted to the hard disc drive 23. Thus, the vibration applied on the hard disc drive 23 is effectively reduced.

Figure 2:
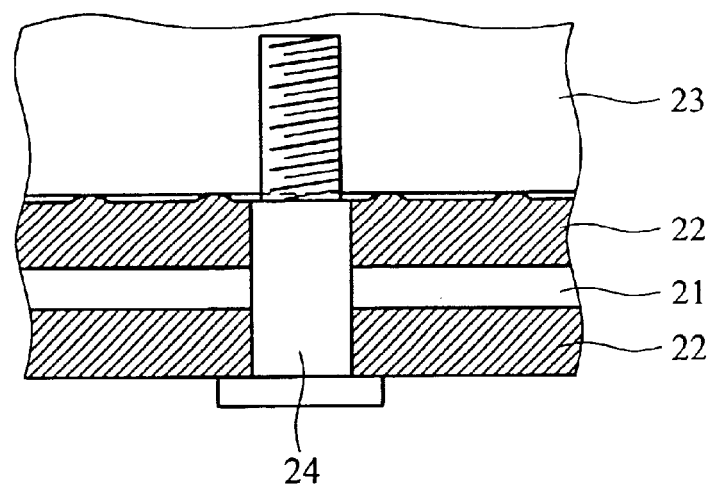
FIG. 2 is cross section showing a combination of a tray, a hard disc drive, a screw, and a vibration-absorbing pad in FIG. 1b.

Each of the screws 24 is passed through the vibration-absorbing pad 22 and combined with the screw holes 231 of the hard disc drive 23 so as to combine the tray 21 and the hard disc drive 23 as shown in FIG. 1a and FIG. 2. Furthermore, referring to FIG. 1c, each of the screws 24 includes a step portion 241 for preventing the vibration-absorbing pad 22 exerting excess pressure. Thus, the effect of the vibration-absorbing pads 22 is maintained and ensures that a certain pre-pressure is kept. As a result, a force for supporting the hard disc drive 23 can be properly provided, and the maximum movement range of the hard disc drive 23 can be restrained.

Each of the anti-ESD members 25 surrounds the vibration-absorbing pad 22, and abuts the screw 24 and the tray 21 respectively to remove an ESD in the hard disc drive 23 to the chassis 10.

As stated above, by means of the vibration-absorbing pads 22 and the screws 24 with the step portions 241, the hard disc drive 23 of this invention is suspended on the vibration-absorbing pads 22 with high damping coefficient. After the vibration transmitted to the vibration-free hard disc drive assembly 20 is reduced by the vibration-absorbing pad 22, the vibration is transmitted to the hard disc drive 23. Thus, the vibration applied to the hard disc drive 23 is effectively reduced. In addition, the cost of this invention is substantially lower than that of a sandwich-typed structure.

The structure of the server system 1 of this invention is described above, and its mathematic model is described as follows.

Figure 3:
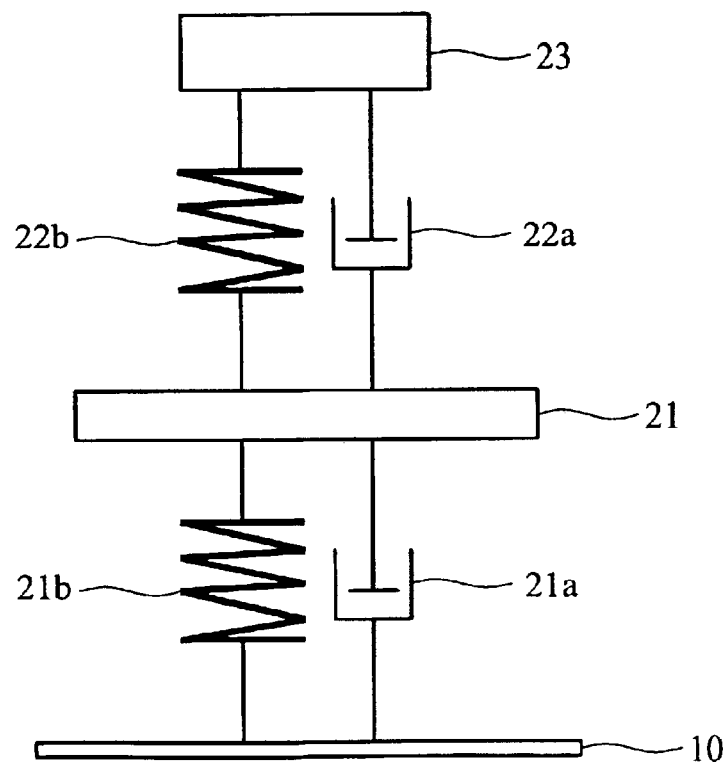
FIG. 3 is a schematic view showing a mathematic model of the vibration-free extractable hard disc drive assembly in FIG. 1b.

Referring to FIG. 3, the vibration-absorbing pads 22 provide stiffness 22b and a damping 22a that is required by the whole vibration-free hard disc drive assembly 20. That is, the vibration-absorbing pads 22 can absorb the vibration energy. Thus, the whole vibration-free extractable hard disc drive assembly 20 can be simulated as two degrees of the freedom dynamic system as shown in FIG. 3. As a result, the ability of the vibration-free hard disc drive assembly 20 is affected by the stiffness 22b and the damping coefficient 22a of the vibration-absorbing pads 22 and a stiffness 21b of the tray 21 combined with the chassis 10. It is noted that the stiffness 21b of the tray 21 may be affected by its fixed manner; therefore, the tray 21 must be tested by proper vibration analysis or measurement analysis. It is noted in FIG. 3 that the damping coefficient 22a of the vibration-absorbing pad 22, compared with the damping coefficient 21a of the tray 21 is very large; therefore, the damping coefficient 21a has very little effect on the whole assembly 20.

Figure 4:
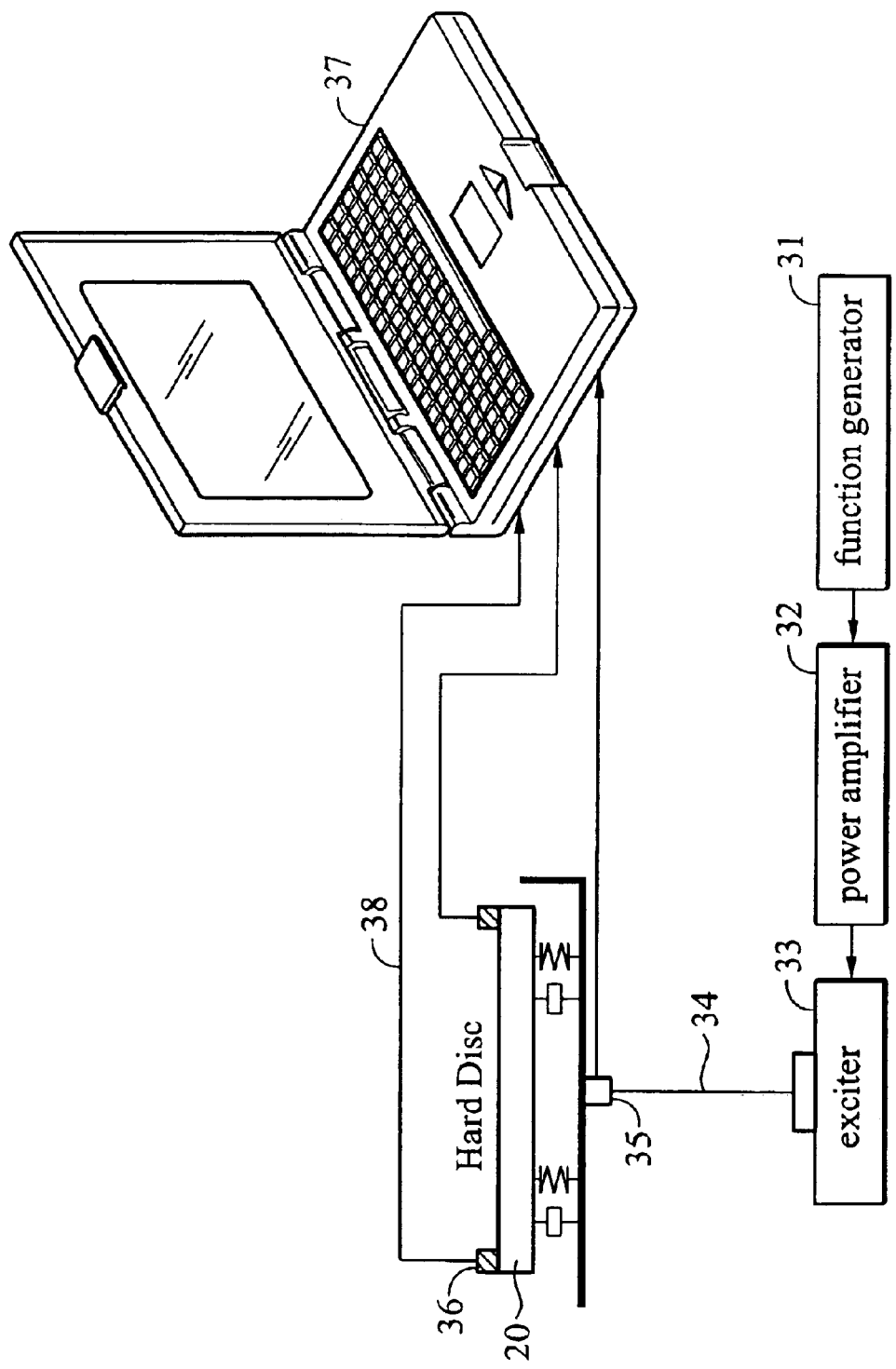
FIG. 4 is a schematic view of a measurement system that can measure the vibration of the vibration-free extractable hard disc drive assembly in FIG. 1b.

To ensure that the vibration-free hard disc drive assembly 20 of this invention achieves its purpose, the dynamic response of the hard disc drive 23 with and without the vibration-absorbing pads 22 is measured by a vibration test system as shown in FIG. 4.

The vibration test system includes a shaker exciting system to provide a vibration source to excite the whole system. The shaker exciting system includes a function generator 31, a power amplifier 32, an exciter 33, a push rod 34, and a force transducer 35. A load signal is transmitted to an FFT analyzer 37 from the force transducer 35 so as to obtain the inputted force of the test system. Then, the vibration response of the test system is measured by plural accelerometers 36. The signal measured by the force transducer 35 and the accelerometers 36 is transmitted to the FFT analyzer 37 via a low noise cable 38 to perform the signal analysis. Thus, the frequency response spectrum of the hard disc drive with and without the vibration-absorbing pads can be obtained. As a result, the mobility of the assembly can be obtained.

The vibration-free extractable hard disc drive assembly of this invention can be applied to an existing server system. The hard disc drive is suspended on the tray by the vibration-absorbing pad with high damping coefficient and the screw with the step portion to avoid vibration. The vibration-absorbing pad absorbs and reduces the vibration transmitted to the hard disc drive from the tray. Thus, the vibration is more effectively reduced.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A vibration-free extractable hard disc drive assembly for a server system, comprised of:
   a tray;
   a vibration-absorbing pad disposed on the chassis; and
   a hard disc drive disposed on the tray via the vibration-absorbing pad, whereby a vibration from the chassis is transmitted to the hard disc drive after the vibration transmitted to the tray is reduced by the vibration-absorbing pad so that the vibration applied on the hard disc drive is reduced.

2. The assembly as claimed in claim 1, further comprising:
   a screw, passed through the vibration-absorbing pad, for combining the tray and the hard disc drive.

3. The assembly as claimed in claim 1, wherein the tray includes a notch in which the vibration-absorbing pad is disposed.

4. The assembly as claimed in claim 1, further comprising:
   an anti-ESD member abutting the screw and the tray respectively to prevent an ESD in the hard disc drive.

5. The assembly as claimed in claim 1, wherein there is a plurality of vibration-absorbing pads, and the vibration-absorbing pads are disposed at both sides of the tray in a symmetrical manner.

6. The assembly as claimed in claim 1, wherein the vibration-absorbing pad is made of rubber.

7. The assembly as claimed in claim 1, wherein the hardness of the vibration-absorbing pad is 70+/−5, and the damping coefficient of the vibration-absorbing pad is tan δ=0.5~0.9.

8. The assembly as claimed in claim 2, wherein the screw includes a step portion for preventing the vibration-absorbing pad exerting excess pressure.

9. The assembly as claimed in claim 3, wherein the vibration-absorbing pad includes a groove to be combined with the notch of the tray.

10. The assembly as claimed in claim 3, wherein the notch is substantially C-shaped to prevent the vibration-absorbing pad disposed in the notch from separating from the notch.

11. The assembly as claimed in claim 4, wherein the anti-ESD member surrounds the vibration-absorbing pad.

12. A server system comprising:

a chassis; and a vibration-free hard disc drive assembly disposed in the chassis in an extractable manner;

wherein the vibration-free hard disc drive assembly comprises:

a tray disposed in the chassis in an extractable manner;

a vibration-absorbing pad disposed on the tray; and a hard disc drive disposed on the tray via the vibration-absorbing pad, whereby a vibration from the chassis is transmitted to the hard disc drive after the vibration transmitted to the tray is reduced by the vibration-absorbing pad so that the vibration applied on the hard disc drive is reduced.

13. The server system as claimed in claim 12, wherein the vibration-free hard disc drive further comprises a screw passing through the vibration-absorbing pad and combines the tray and the hard disc drive.

14. The server system as claimed in claim 12, wherein the tray includes a notch for the vibration-absorbing pad to dispose therein.

15. The server system as claimed in claim 12, wherein the vibration-free system further comprises an anti-ESD member abutting the screw and the tray respectively to remove an ESD in the hard disc drive to chassis.

16. The server system as claimed in claim 12, wherein there is a plurality of vibration-absorbing pads, and the vibration-absorbing pads are disposed at both sides of the tray in a symmetrical manner.

17. The server system as claimed in claim 12, wherein the vibration-absorbing pad is made of rubber.

18. The server system as claimed in claim 13, wherein the screw includes a step portion for preventing the vibration-absorbing pad exerting excess pressure.

19. The server system as claimed in claim 14, wherein the vibration-absorbing pad includes a groove to be combined with the notch of the tray.

20. The server system as claimed in claim 14, wherein the notch is substantially C-shaped to prevent the vibration-absorbing pad disposed in the notch from separating from the notch.

* * * * *